United States Patent [19]

Caby et al.

[11] 4,323,805

[45] Apr. 6, 1982

[54] DIRECT CURRENT MICROMOTOR

[75] Inventors: Jean-Claude Caby; Jean-Claude Girardin, both of La Chaux-de-Fonds, Switzerland

[73] Assignee: Portescap, La Chaux-de-Fonds, Switzerland

[21] Appl. No.: 162,483

[22] Filed: Jun. 24, 1980

[30] Foreign Application Priority Data

Jun. 25, 1979 [CH] Switzerland .................. 5511/79

[51] Int. Cl.$^3$ ........................................... H02K 13/04
[52] U.S. Cl. ..................................... 310/237; 310/266
[58] Field of Search ................................ 310/237, 866

[56] References Cited

U.S. PATENT DOCUMENTS

| | | | |
|---|---|---|---|
| 3,812,576 | 5/1974 | Yamaguchi | 310/237 X |
| 3,869,788 | 3/1975 | Lazavoin et al. | 310/237 X |
| 4,037,125 | 7/1977 | Aoki | 310/237 X |
| 4,099,077 | 7/1978 | Maekawa | 310/237 |
| 4,103,196 | 7/1978 | Saito et al. | 310/266 |

Primary Examiner—Donovan F. Duggan
Attorney, Agent, or Firm—Cushman, Darby & Cushman

[57] ABSTRACT

The invention relates to a direct current micromotor having an iron-free rotor comprising a coil support in the form of a disc and a cylindrical coil 10 fixed at one of its ends to the periphery of this disc, the coil support bearing the collector segments and being constructed in the form of a printed circuit board 11. The collector segments are constituted by circular segments of conducting material 12 having a radial extension 13 which extends to the periphery of the disc. A peripheral connection sector 14 is separated from the sector 12 by an insulating zone 15.

This arrangement enables damage to the brushing surface of the collector brushes to be avoided during manufacture, such damage being caused by a coating of welding flux or by inappropriate heating.

3 Claims, 4 Drawing Figures

DIRECT CURRENT MICROMOTOR

The present invention relates to a direct current micromotor which comprises a stator having a fixed magnetic circuit, and an iron-free rotor comprising a coil support substantially in the form of a disc and a cylindrical coil fixed at one of its ends to the periphery of the said support, the coil support comprising collector segments and means for connecting the segments to respective portions of the coil, and the stator comprising commutator brushes arranged to co-operate with the said collector segments.

In a micromotor of this type, the connection of the various portions of the coil to the collector segments is a particularly delicate operation as a result of the very small thicknesses of wire used for the coil and the reduced dimensions of the surfaces available for welding these wires to the connection portions associated with the collector segments. Thus the surface to contact the brushes is often damaged during manufacture, either by a coating of welding flux or as a result of inappropriate heating.

The invention aims to remedy these drawbacks and to provide a micromotor in which the rotor has a particularly simple construction and is adapted to the connection of the various portions of the coil by welding, either directly to the collector segments, or therebetween.

According to the present invention, there is provided a direct current micromotor which comprises a stator having a fixed magnetic circuit, and an iron-free rotor comprising a coil support substantially in the form of a disc and a cylindrical coil fixed at one of its ends to the periphery of the said support, the coil support comprising collector segments and means for connecting the segments to respective portions of the coil, and the stator comprising commutator brushes arranged to co-operate with the said collector segments, wherein the coil support comprises a printed circuit board having an annular radially inner zone in which circular sectors of conducting material are formed and constitute the collector segments, the latter segments having a radial extension which extends to the periphery of the support, the printed circuit board further having a peripheral annular zone in which peripheral sectors of conducting material are formed and cover the greater portion of said peripheral zone, at least the sectors of a first group of peripheral sectors being separated in the radial direction, from the collector segments, by way of an insulating zone, at least the sectors of a second group of peripheral sectors being part of the said radial extensions of the collector segments, the wire ends of the various portions of the coil being connected to at least one portion of the peripheral sectors.

Preferred embodiments of the invention are set forth in claims 2 and 3.

The design of the rotor of the micromotors of the invention enables the cost price of micromotors of the said type to be reduced which leads to greater simplicity in manufacture and a reduction in wastage.

Further advantages and characteristic features of the invention will become evident from the description of various embodiments, given by way of example and illustrated in the accompanying drawing, in which.

Figure 1:
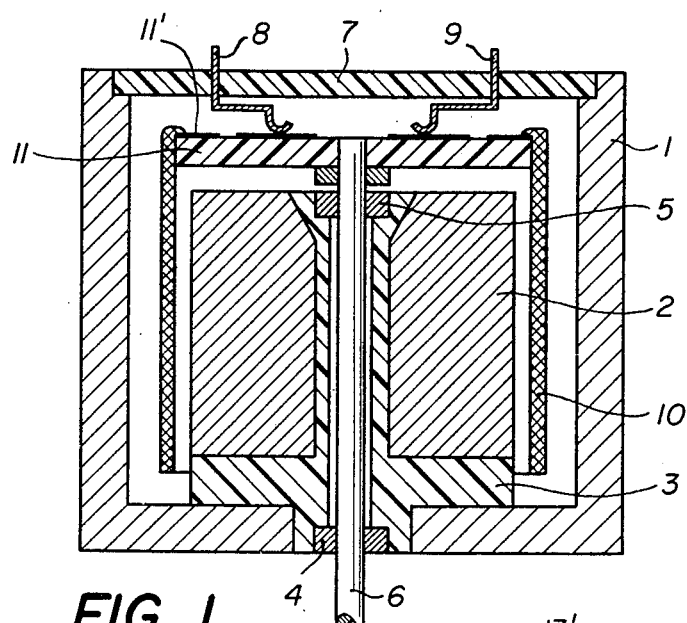
FIG. 1 is an axial section through a micromotor of the invention.

FIG. 1 is a somewhat schematic illustration of a micromotor having a stator which comprises a substantially cylindrical housing 1 of a magnetically permeable material, a permanent magnet 2 of an externally cylindrical shape and magnetises in a diametric direction and having a central aperture, and a magnet support 3 of moulded plastics material arranged so as to connect the magnet 2 to the housing 1 and also acting as a support having two bearings 4 and 5 for the shaft 6 of the motor. The stator also comprises a cover 7 of plastics material which closes the housing and supports two commutator brushes 8, 9.

The rotor of the motor is constituted by a cylindrical coil 10 which is self-supporting and fixed at one end, for example by adhesion or by moulding, to the peripheral surface of a coil support 11. This coil support is constituted by a disc which is cut from a printed circuit board, the conducting portion of which is designated by 11'. The thickness of the disc is selected such that the coil support 11 may be mounted directly on the shaft 6 of the rotor.

Figure 2:
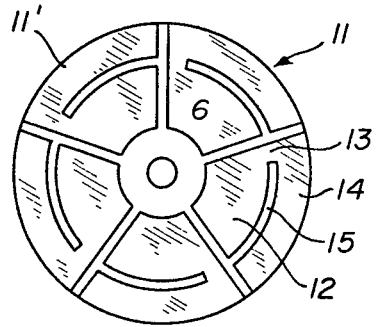
FIG. 2 is a top view of a first embodiment of the printed circuit board constituting the coil support.

FIG. 2 shows, as a top view of the coil support 11, a typical example of a printed circuit 11' used in the micromotor of the invention. Circular sectors 12 constituting the collector segments against which the brushes 8, 9 rub are formed in a radially inner annular zone of the surface of the circuit.

The sectors 12 have a radial extension 13 which extends to the periphery of the support 11 and rejoins a peripheral annular sector 14 constructed, in this example, as a single component with the end of the radial extension 13. The peripheral sector is separated from the collector segment 12 by an insulating zone 15.

The wires representing the ends of the various portions of the coil 10 are folded back and welded directly to the sector 14. The large surface and the peripheral extent of the latter provide a large degree of tolerance in respect of the position of the welding point and reduce the risk of overheating of the sector forming the collector segment. Moreover, the insulating zone 15 provides a barrier against the flow of the welding flux onto the collector segment.

Welding is preferably carried out in two steps, both when spot welding is used and when laser welding is used. In a first step the insulation of the wire ends is removed, and in a second step these ends are welded to the sector 14.

The zones of the printed circuit constituting the track for the brushes may, if necessary, undergo a galvanic treatment so as to have the required properties of wear resistance.

Figure 3:
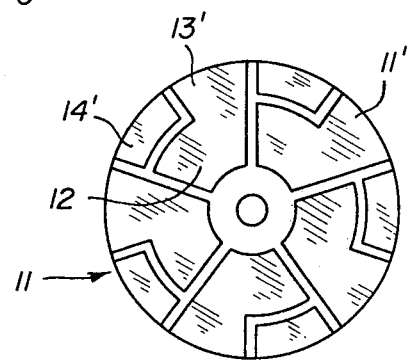
FIG. 3 is a view similar to that of FIG. 2 of a further embodiment of the printed circuit board.
Figure 4:
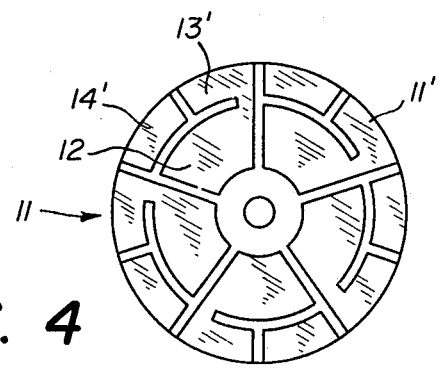
FIG. 4 is a view similar to that of FIG. 2 of a third embodiment of the printed circuit board.

FIGS. 3 and 4 show embodiments of the support 11 which are similar to those of FIG. 2, but which have two separate peripheral sectors disposed opposite each collector segment. Thus, in FIG. 3, the extension 13' of the sector 12 forming the collector segment constitutes a first peripheral connection sector. In addition, a separate peripheral sector 14' constitutes a second connection zone which enables an internal connection, isolated from the collector, between the coil portions to be achieved by welding on this zone.

FIG. 4 shows a variant of a device of this type, in which the peripheral sector 13' is separated from the sector 12 by an insulating zone, except over a narrow zone of radial extension of the latter, in a way similar to that of FIG. 2.

It is clear from the above description that the invention enables manufacturing wastage to be reduced and enables the manufacture of the rotors to be simplified and facilitated, in particular by avoiding contamination and damage by heat of the collector segments during welding of the connection wires.

We claim:

1. A direct current micromotor which comprises a stator having a fixed magnetic circuit, and an iron-free rotor comprising a coil support substantially in the form of a disc and a cylindrical coil fixed at one of its ends to the periphery of the said support, the coil support comprising collector segments and means for connecting the segments to respective portions of the coil, and the stator comprising commutator brushes arranged to cooperate with the said collector segments, wherein the coil support comprises a printed circuit board having an annular radially inner zone in which circular sectors of conducting material are formed and constitute the collector segments, the latter segments having a radial extension which extends to the periphery of the support, the printed circuit board further having a peripheral annular zone in which peripheral sectors of conducting material are formed and cover the greater portion of said peripheral zone, at least the sectors of a first group of peripheral sectors being separated in the radial direction, from the collector segments, by way of an insulating zone, at least the sectors of a second group of peripheral sectors being part of the said radial extensions of the collector segments, the wire ends of the various portions of the coil being connected to at least one portion of the peripheral sectors.

2. A micromotor as claimed in claim 1, in which the sectors of the first and second group are disposed alternately along the periphery of the support and are insulated from one another.

3. A micromotor as claimed in claim 1, in which the sectors of the first and second group are disposed alternately along the periphery of the rotor and are connected in pairs so as to form a corresponding single peripheral sector for each collector segment.

* * * * *